(12) United States Patent
Shin

(10) Patent No.: US 7,997,811 B2
(45) Date of Patent: Aug. 16, 2011

(54) CAMERA MODULE

(75) Inventor: Jeong-Kil Shin, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 245 days.

(21) Appl. No.: 12/179,724

(22) Filed: Jul. 25, 2008

(65) Prior Publication Data

US 2009/0028546 A1     Jan. 29, 2009

(30) Foreign Application Priority Data

Jul. 27, 2007   (KR) .................. 10-2007-0075803

(51) Int. Cl.
*G03B 9/02*   (2006.01)
(52) U.S. Cl. ......................................... 396/505
(58) Field of Classification Search .......... 396/505–510; 359/237, 468, 738, 739, 894
See application file for complete search history.

(56) References Cited

U.S. PATENT DOCUMENTS

| | | | | |
|---|---|---|---|---|
| 4,945,379 A * | 7/1990 | Date et al. | ...................... | 396/246 |
| 5,191,203 A * | 3/1993 | McKinley | .................. | 250/208.1 |
| 6,320,610 B1 * | 11/2001 | Van Sant et al. | .............. | 348/143 |
| 6,747,703 B1 * | 6/2004 | Simamura | ...................... | 348/362 |
| 7,292,280 B2 * | 11/2007 | Yamazaki et al. | ............ | 348/363 |
| 2003/0019931 A1 * | 1/2003 | Tsikos et al. | ................... | 235/454 |
| 2003/0117600 A1 * | 6/2003 | Taniuchi et al. | ................ | 355/53 |
| 2007/0024958 A1 * | 2/2007 | Choi et al. | ..................... | 359/356 |
| 2008/0024653 A1 * | 1/2008 | Ikeda | ............................. | 348/362 |
| 2008/0137219 A1 * | 6/2008 | Noda | ............................. | 359/795 |

* cited by examiner

*Primary Examiner* — W. B. Perkey
*Assistant Examiner* — Warren K Fenwick
(74) *Attorney, Agent, or Firm* — Cha & Reiter, LLC

(57) ABSTRACT

A camera module including a lens system with at least one lens is capable of capturing a still image and a moving picture. The camera module includes a housing containing the lens system with an opening on a surface thereof facing an object of the lens system. An aperture diaphragm can be selectively positioned between the object and the lens system for a still image and/or a moving picture.

11 Claims, 5 Drawing Sheets

CAMERA MODULE

CLAIM OF PRIORITY

This application claims the benefit under 35 U.S.C. §119 (a) of a Korean Patent Application filed in the Korean Intellectual Property Office on Jul. 27, 2007 and assigned Serial No. 2007-75803, the disclosure of which is hereby incorporated by reference in its entirety.

BACKGROUND OF THE INVENTION

1. Field of the Invention

The present invention generally relates to a camera module. More particularly, the present invention relates to a camera module having an image sensor, which is capable of capturing moving pictures.

2. Description of the Related Art

Digital cameras taking the form of a camera module with an image sensor have recently become popular. Modularized digital cameras of a small size are under development as are applications to be built into portable communication terminals or portable digital devices, such as mobile phones.

Such a camera module includes a lens system with a plurality of lenses and an image sensor for electronically converting an image of an object formed upon it by the lens system.

The lens system may have, for example, an object lens facing an object, an aberration correction lens for suppressing aberration, and/or lenses for capturing an image of the object on the image sensor.

The optical performance of the lens system can be represented as an F-number. The F-number quantitatively defines light intensity that the lens can receive, expressed as $$F = \frac{f}{D} \tag{1}$$

where F (i.e. F-number) is the focal length f of the lens system divided by the diameter D of the lens system. As F is smaller, the lens system receives a larger light intensity. For example, given a lens system with F=2 and another lens system with F=2.8, the former is brighter than the latter under the identical conditions.

For video, with more frames per second, more natural moving pictures are achieved. This is possible by use of a software program. However, as additional frames per second are added, this increases noise in the moving pictures. Noise can be reduced by receiving more light. Therefore, it is preferable to take moving pictures using a lens system capable of receiving more light.

Meanwhile, still images can be captured even in the darkness if the F-number is small. However, an aberration may increase which causes degradation of image quality in a general photographing environment.

A typical digital camera module is equipped with a function for capturing both moving pictures and still images. However, the difference in photography between a moving picture and a still image leads to the degradation of either the quality of the still image or the moving picture.

That is, a camera module built in a general portable digital device is limited in the number of lenses forming a lens system due to limitations in size. The F-number for taking a still image ranges from 2.6 to 2.8. This F-number may cause a low light environment for moving pictures. As a consequence, the moving pictures are interrupted or noisier.

SUMMARY OF THE INVENTION

The invention addresses at least the aforementioned problems and/or disadvantages and to provides at least the advantages described below. Accordingly, an aspect of exemplary embodiments of the present invention is to provide a camera module which can be miniaturized, for capturing both a still image and a moving picture, while minimizing interruptions and a noise increase in recording the moving picture.

In accordance with an aspect of the present invention, there is provided a camera module for capturing a still image and a moving picture, in which a housing containing a lens system with at least one lens has an opening on its surface facing an object of the lens system, and an aperture diaphragm is positioned between the object and the lens system.

In another aspect, the invention provides a system for selectively placing an aperture diaphragm between an object and a lens system that includes: a means for selecting between a still image mode and a moving image mode; a rotation means for placing the aperture diaphragm between the object and the lens system in the still image mode and for substantially removing the diaphragm from its position between the object and the lens system in the moving image mode.

In another aspect, the invention provides a method of reducing noise in an image captured by a camera module having multiple modes that includes electing a still image mode or a moving image mode; placing an aperture diaphragm between an object and a lens system in the still image mode; and removing the aperture diaphragm from its position between the object and the lens system in the moving image mode.

BRIEF DESCRIPTION OF THE DRAWINGS

The above features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions may be omitted for clarity and conciseness when their inclusion would obscure appreciation of the subject matter of the present invention by a person of ordinary skill in the art.

Figure 1A:
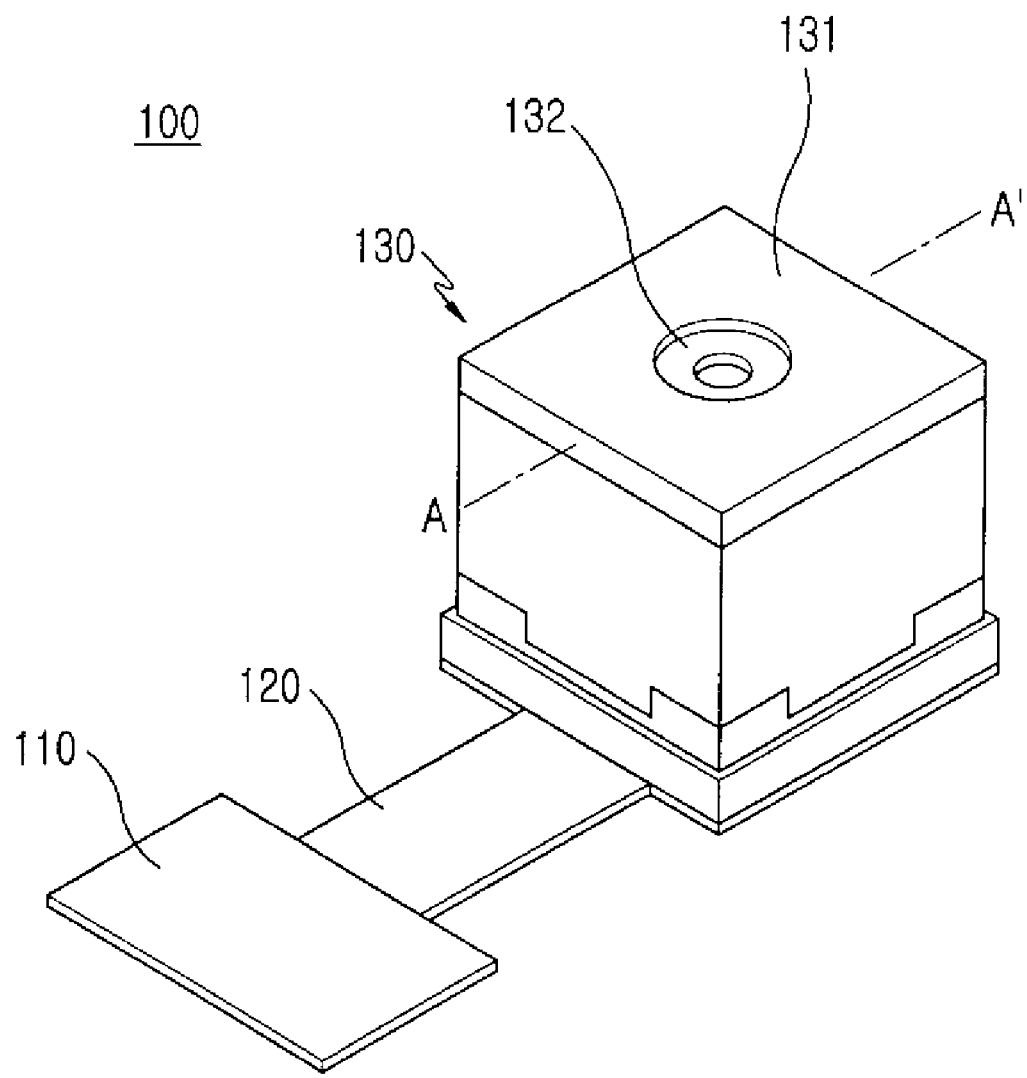
FIGS. 1A and 1B are perspective views of a camera module according to the present invention.
Figure 1B:
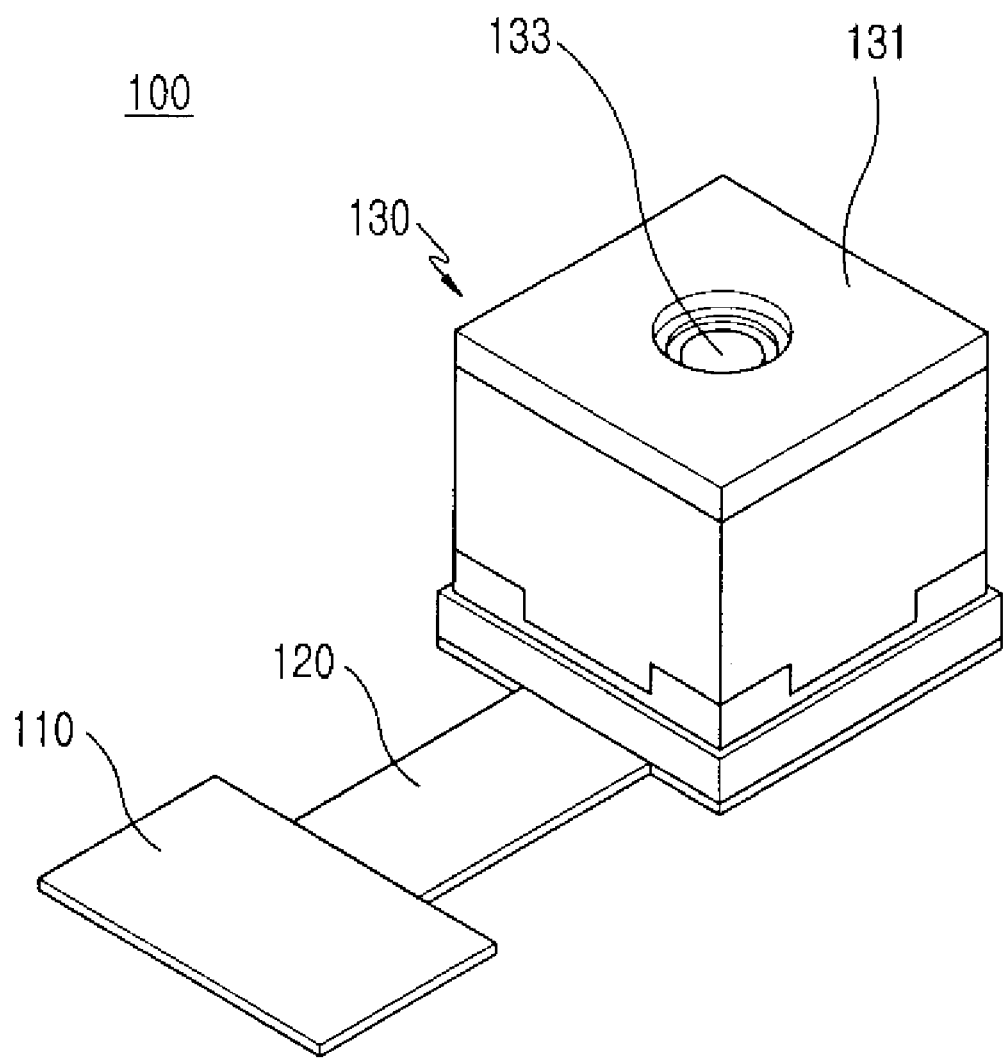

FIGS. 1A and 1B are perspective views of a camera module according to the present invention. FIG. 1A illustrates the existence of an aperture diaphragm 132 between an object and a lens system to capture a still image with an increased resolution, and FIG. 1B illustrates the substantial absence of the aperture diaphragm 132 between the object and the lens system to allow a camera module 100 to receive comparatively more light when capturing a moving picture.

The camera module 100 according to the present invention selectively uses the aperture diaphragm 132 when capturing a still image and/or a moving picture. This increases the resolution of a still image and takes moving pictures with an increased light intensity and thus with reduced noise.

Figure 2:
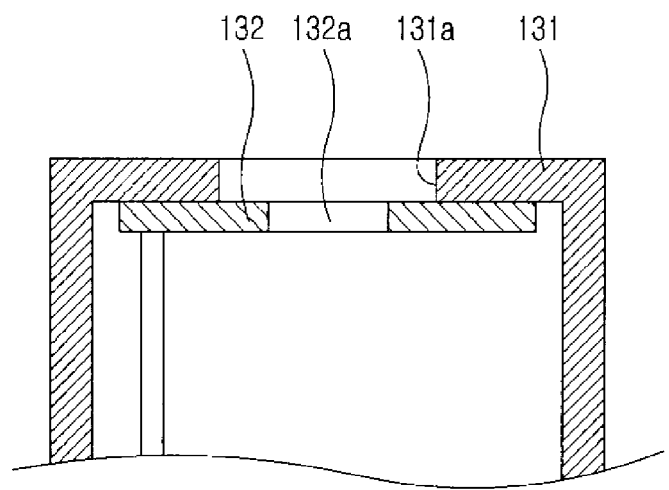
FIG. 2 is a partial sectional view of the camera module, taken along line A-A' in FIG. 1A.
Figure 3:
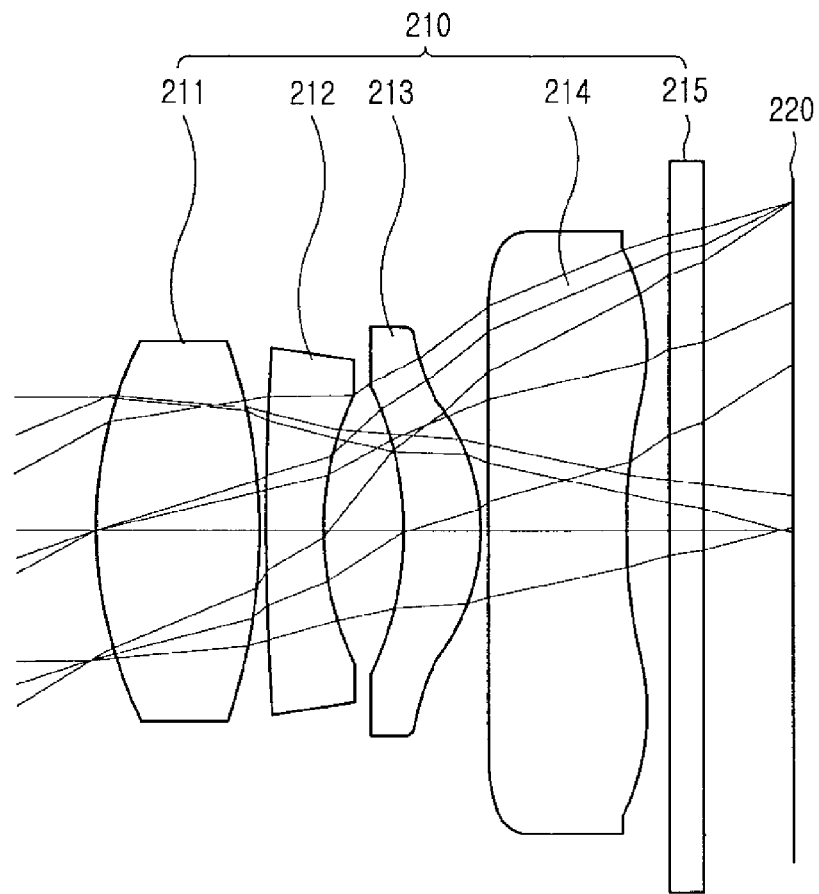
FIG. 3 illustrates the structure of a lens system that can be mounted in the camera module illustrated in FIGS. 1A and 1B.

FIG. 2 is a partial sectional view of the camera module, taken along line A-A' in FIG. 1A, and FIG. 3 illustrates the structure of a lens system that can be mounted in the camera module illustrated in FIGS. 1A and 1B.

Referring to FIGS. 1A to 3, the camera module 100 of the present invention includes a camera lens system 210 with one or more lenses 211 to 214 and a housing 131 for containing the lens system 210 therein. The housing 131 also has an opening 133 on a surface thereof facing an object of the lens system 210, and contains aperture diaphragm 132 between the object and the lens system 210.

An image sensor 220 can convert an image of the object captured by the lens system 210 to electrical data and output the electrical data. The output can pass, for example, to a Printed Circuit Board (PCB) 110 connected to the image sensor 220 by a Flexible Printed Circuit Board (FPCB) 120.

The housing 131 contains the lens system 210 and the image sensor 220. The aperture diaphragm 132 is also mounted in the housing 131 so that it can rotate around an internal rotation shaft (not depicted). That is, the rotation shaft transfers a driving force received from, for example, an actuator to the aperture diaphragm 132 so that the aperture diaphragm 132 can be disposed between the object and the lens system 210, when a moving picture and a still image are taken.

By satisfying a brightness condition expressed as the following formula, a still image has an image quality of an improved resolution with aberration suppressed and a moving picture can be taken with less noise and less interruption.

$$\frac{(F_{still\ image})^2}{(F_{moving\ picture})^2} \geq 1.5 \qquad (2)$$

where $F_{still\ image}$ denotes a minimum F-number required for capturing a still image and $F_{moving\ picture}$ denotes a minimum F-number required for capturing a moving picture. The square of an F-number is the brightness of a lens system. To increase the brightness of the lens system for a moving picture to 1.5 times that of the lens system for a still image, the above formula should be satisfied.

That is, the camera module 100 of the present invention has the lens system 210 that is set to the brightness required for capturing a moving picture and the aperture diaphragm 132 has an aperture size that can meet the F-number required for capturing a still image.

FIG. 3 illustrates the structure of a lens system that can be mounted in the camera module illustrated in FIGS. 1A and 1B. Table 1 and Table 2 illustrate an example of a lens system design.

The lens system 210 illustrated in FIG. 3 includes the first to fourth lenses 211 to 214 and an optical filter 215. The lens system 210 forms an image of an object on the image sensor 220. Lenses 211 to 214 contain a number of surfaces which influence the formation of an image on image sensor 220. Table 1 is an example of various properties of such surfaces.

TABLE 1

| Surface number | Surface shape | Curvature radius (R; mm) | Thickness (mm) | Refractive index (N) | Abbe number ($v_d$) | Notes |
|---|---|---|---|---|---|---|
| 1 | Spherical | ∞ | 0 | | | Aperture diaphragm |
| 2 | Non-spherical | 3.207 | 1.417 | 1.744 | 44.8 | First lens |
| 3 | Spherical | −4.780 | 0.080 | | | |
| 4 | Non-spherical | −10.787 | 0.500 | 1.639 | 23.4 | Second lens |
| 5 | Non-spherical | 3.415 | 0.720 | | | |
| 6 | Non-spherical | −2.508 | 0.672 | 1.530 | 55.8 | Third lens |
| 7 | Non-spherical | −1.367 | 0.080 | | | |
| 8 | Non-spherical | 53.994 | 1.192 | 1.530 | 55.8 | Fourth lens |
| 9 | Non-spherical | 2.300 | 0.395 | | | |
| 10 | Spherical | ∞ | 0.3 | 1.517 | 64.2 | Optical filter |
| 11 | Spherical | ∞ | 0.8 | | | |

The above lens system design is based on a focal length of 4.8 (mm) for the lens system, an F-number of 2.1 for moving pictures, an F-number of 2.8 for still images, and 2ω of 61.4 deg.

Non-spherical coefficients of the lens system according to the present invention can satisfy equation (3). An example of non-spherical surfaces described by equation (3) can be found in Table 2.

$$x = \frac{c^2 y^2}{1 + \sqrt{1 - (K+1)c^2 y^2}} + Ay^4 + By^6 + Cy^8 + Dy^{10} + Ey^{12} \qquad (3)$$

where x denotes a distance from the center of an optical surface along an optical axis, y denotes a distance in a direction perpendicular to the optical axis, c denotes the curvature of the center of the optical surface (the reciprocal of a curvature radius), K denotes a conic coefficient, and A, B, C, D and E are the non-spherical coefficients.

TABLE 2

| Surface | K | A | B | C | D | E |
|---|---|---|---|---|---|---|
| 2 | −1.628115E+00 | −3.586050E−03 | −2.275680E−03 | −4.799290E−04 | −1.638460E−03 | 7.472300E−04 |
| 4 | 0.000000E+00 | 3.126780E−02 | −6.22609E−03 | 1.339050E−02 | −3.552610E−03 | |
| 5 | 3.715750E+00 | 2.459610E−02 | −1.353580E−02 | 7.364900E−03 | 4.015210E−03 | −1.447380E−03 |
| 6 | −30160770E+00 | −3.418200E−02 | 2.644140E−02 | −2.974510E−03 | −5.214480E−03 | 2.735800E−03 |

TABLE 2-continued

| Surface | K | A | B | C | D | E |
|---|---|---|---|---|---|---|
| 7 | −7.501490E−01 | 4.905670E−02 | 6.567230E−03 | 1.309540E−03 | 1.344030E−03 | −5.852950E−04 |
| 8 | −2.816798E+04 | −1.398090E−02 | 5.422210E−03 | −2.548580E−04 | −1.347690E−04 | 1.758970E−05 |
| 9 | −9.844856E+00 | −2.975090E−02 | 4.075890E−03 | −4.000170E−04 | 5.415300E−06 | 9.774680E−07 |

In Table 1, the thicknesses of the lenses 211 to 214 and the distance between every pair of lenses are listed under thickness (mm). Table 2 illustrates an exemplary design of non-spherical lenses in the lens system designed as illustrated in Table 1.

Figure 4:
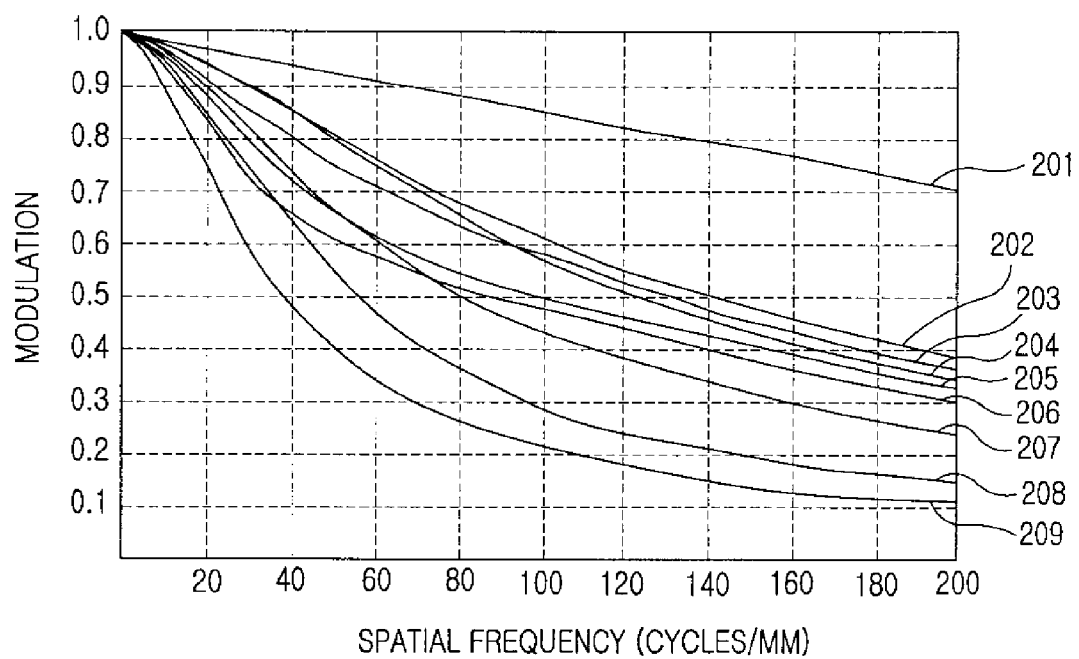
FIGS. 4 and 5 are graphs illustrating measurements of optical characteristics of the lens system illustrated in FIG. 3.
Figure 5:
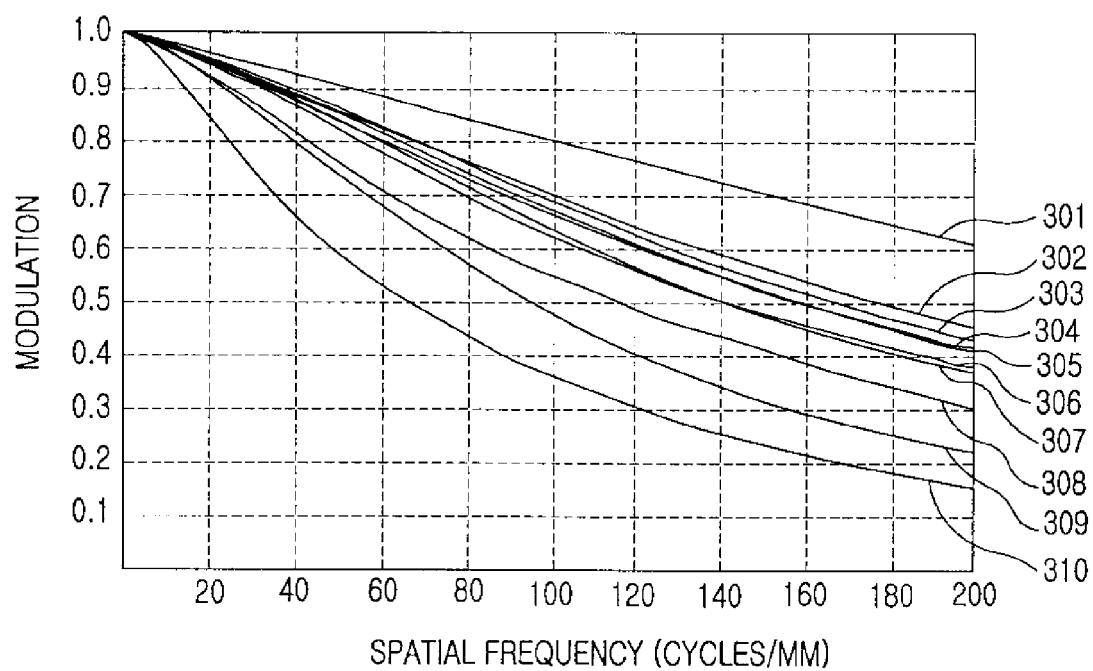

FIGS. 4 and 5 are graphs illustrating measurements of optical characteristics of the lens system illustrated in FIG. 3. FIG. 4 illustrates Modulation Transfer Function (MTF) curves when moving pictures are taken and FIG. 5 illustrates MTF curves when still images are taken.

An MTF value is obtained by comparing a real image of an object with an image of the object on a particular lens converged onto an image sensor (an image plane). An ideal MTF value is 1.

As is apparent from the above description, the camera module of the present invention includes an aperture diaphragm that is selectively used for capturing a still image. Therefore, a still image is captured with an improved resolution. When capturing moving pictures, the aperture diaphragm is displaced from its position such that it does not influence the formation of an image on image sensor 220. Hence, moving pictures can be seamlessly recorded with reduced interruptions.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A camera module capable of capturing a still image and a moving picture, comprising:
 a housing containing a lens system with at least one lens, said housing having an opening on a surface facing an object of the lens system; and
 an aperture diaphragm for restricting light passing through the opening on a surface of the housing facing the object of the lens system, said aperture diaphragm being rotatably arranged according to a mode selection so that said aperture diaphragm moves to a first position along an optical path between the object and the lens system to increase resolution. when a still image is captured and to a second position where the aperture diaphragm is completely displaced from the optical path so as not to influence a formation of an image when a moving picture is captured.

2. The camera module of claim 1, wherein the aperture diaphragm has a smaller diameter than the lens system.

3. The camera module of claim 2, wherein the lens system has a brightness 1.5 or more times larger than a brightness of the aperture diaphragm.

4. The camera module of claim 1, wherein the aperture diaphragm is fixed rotatably in the housing.

5. The camera module of claim 4, wherein the aperture diaphragm rotates around an internal rotation shaft.

6. The camera module of claim 5, wherein the rotation shaft transfers a driving force to the aperture diaphragm so that the aperture diaphragm is disposed between the object and the lens system when a still image is taken.

7. The camera module of claim 1, wherein the aperture diaphragm is selectively employed for, capturing a still image.

8. The camera module of claim 1, wherein the aperture diaphragm only has a single aperture with a fixed size.

9. A camera module capable of capturing a still image and a moving picture, comprising:
 a housing containing a lens system with at least one lens, said housing having an opening on a surface facing an object of the lens system; and
 an aperture diaphragm rotatably arranged in a first position between the object and the lens system for restricting light passing through the opening on a surface of the housing facing the object of the lens system,
 wherein the aperture diaphragm is fixed rotatably in. the housing and rotates around a rotation shaft, and
 wherein the rotation shaft transfers a driving force to the aperture diaphragm so that the aperture diaphragm is disposed in a second position somewhere other than between the object and the lens system when a moving image is taken.

10. A system for selectively placing an aperture diaphragm between an object and a lens system comprising:
 means for selecting between a still image mode and a moving image mode; and
 a rotation means for placing the aperture diaphragm between the object and the lens system in the still image mode and for substantially removing the entire aperture diaphragm from its position between the object and the lens system in the moving image mode.

11. A method of reducing noise in an image captured by a camera module having multiple modes comprising:
 selecting a still image mode or a moving image mode;
 placing an aperture diaphragm between an object and a lens system in the still image mode; and
 removing the aperture diaphragm from its position between the object and the lens system. in the moving image mode So as not to restrict incoming light toward the lens system.

* * * * *